Jan. 18, 1966    J. D. KIRSCHMANN    3,229,857
APPLICATOR FOR GRANULAR MATERIAL
Filed April 3, 1961    2 Sheets-Sheet 1
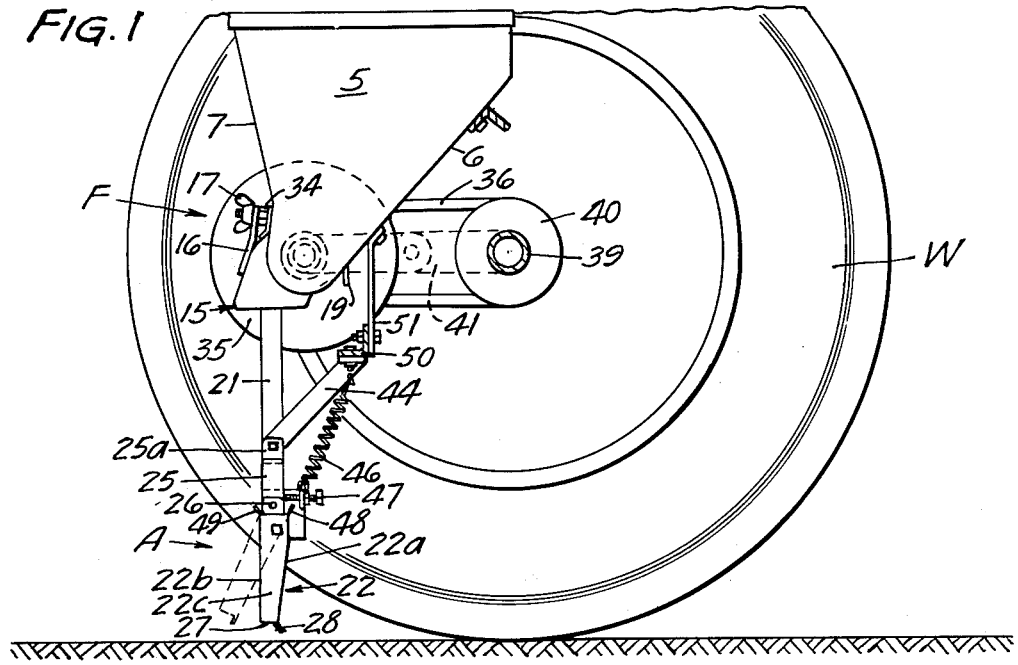
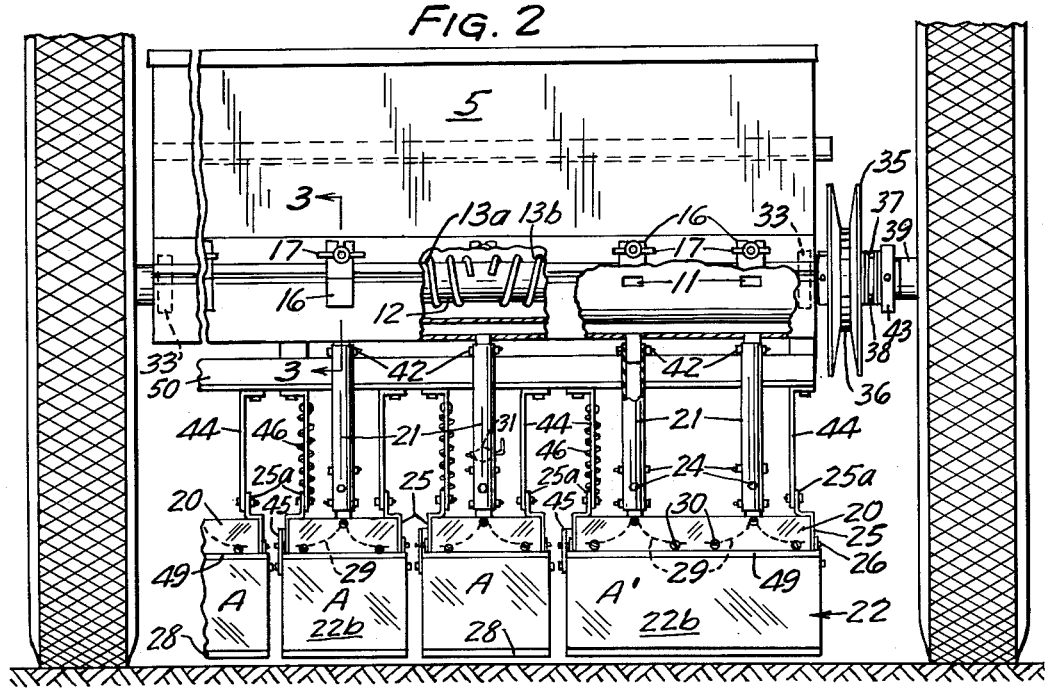
INVENTOR
JOHN D. KIRSCHMANN
BY Williamson & Palmatier
ATTORNEYS Jan. 18, 1966         J. D. KIRSCHMANN         3,229,857
APPLICATOR FOR GRANULAR MATERIAL
Filed April 3, 1961         2 Sheets-Sheet 2
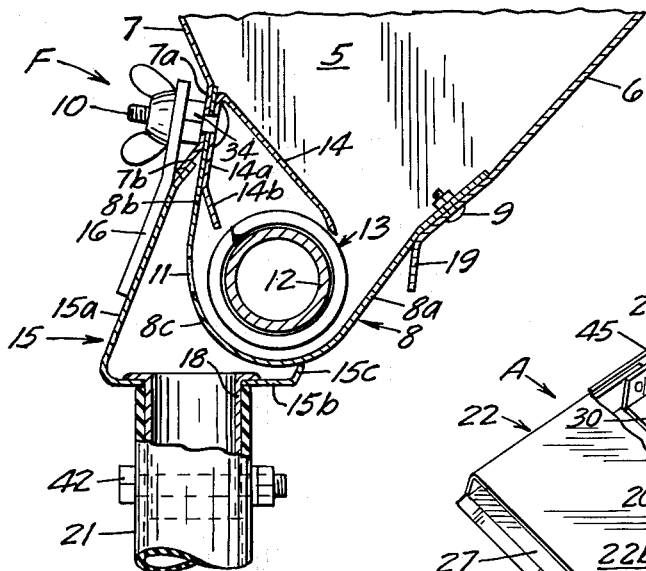
INVENTOR
JOHN D. KIRSCHMANN
BY
Williamson+Palmatier
ATTORNEYS United States Patent Office 3,229,857
Patented Jan. 18, 1966

3,229,857
APPLICATOR FOR GRANULAR MATERIAL
John D. Kirschmann, 23 W. Owens, Bismarck, N. Dak.
Filed Apr. 3, 1961, Ser. No. 100,240
10 Claims. (Cl. 222—159)

This invention relates generally to apparatus for applying and distributing granular material along the ground.

This invention has particular applicability to apparatus for accomplishing the uniform application and distribution of granular herbicide on the ground. However, the apparatus of this invention has utility in any situation where it is desired to distribute fine pulverulent granular material on the ground in a uniform even pattern, and it will be understood that the scope of the invention is not limited to use with herbicides only.

Herbicides have been developed which can be effectively applied in dry granular form to prevent or inhibit the growth of weeds and other undesirable plant growth. When utilized in row-crop farming, it is desirable that the herbicide granules be applied in a wide uniform band on the row or rows being treated.

One objective of this invention is to provide novel applicating apparatus for granular material which is especially designed for applying granular material such as a granular herbicide or small seeds over a crop row in a wide uniform band.

A more specific object is to provide applicating and distributing apparatus for granular material which is simple in design and relatively inexpensive in construction and which is designed not only to distribute the material in a wide uniform band, but is also designed to shield the material being distributed from the wind and ground currents to enable it to be applied directly to the ground as evenly as possible without being disturbed by said wind and ground currents.

Another object is to provide an applicating and distributing device of the class described which is adapted for ground traversing movement for treating a single row or a plurality of adjacent rows simultaneously.

Still another object is to provide applicating and distributing apparatus of the class described utilizing a novel combination of applicator and feed mechanism in which the applicator is designed to apply the granular material in an even uniform band on the row or rows being traversed and the feed mechanism delivers the material to the applicator at a uniform rate so that the material is distributed evenly on the row not only across the entire width thereof but also along the entire length thereof achieving substantially uniform concentrations and application throughout the length and breadth of the band of material applied.

A further object is a granular material applicator of the class described which is capable of being mounted on not only the novel feed mechanism disclosed herein, but also on any other mobile feed mechanism or distributing unit which utilizes a feed hopper having means for discharging the material in the hopper through one or more discharge spouts unto the ground below.

A still further object is a device of the class described which permits selectively varying the rate of discharge and density of application of the granular material, and is further designed to provide for testing of the rate and strength of application.

Another object is a novel combination of feed and applicator apparatus for applying granular material to a plurality of rows simultaneously which is capable of utilizing interchangeable parts to vary the spacing between the bands of applied granular material in accordance with variations in the spacing between the crop rows being treated.

These and other objects and advantages of this invention will more fully appear from the following description made in connection with the accompanying drawings wherein like reference characters refer to the same or similar parts throughout the several views, and in which:

FIG. 1 is a side elevational view of a mobile material distributing and applying unit employing the applicator and feed mechanism of this invention, with one wheel removed for clarity;

FIG. 2 is a back elevational view of the unit of FIG. 1 (as seen from the left side of FIG. 1 looking in the direction of travel) with portions broken away;

FIG. 3 is a cross sectional view of the feed mechanism unit on an enlarged scale as taken along the line 3—3 of FIG. 2;

FIG. 4 is a perspective view of an applicator of this invention on an enlarged scale with portions broken away for clarity;

FIG. 5 is a rear elevational view on an enlarged scale of the applicator with portions broken away for clarity; and FIG. 6 is a partial perspective view of the applicator of this invention as seen from the right front side thereof.

Reference is now made to the accompanying drawings for a more detailed description of my invention.

The apparatus of this invention includes novel applicators of the type identified as A and A' which are adapted to be cooperatively mounted on and used in conjunction with a mobile feed unit F which feeds the material to be distributed to the applicators. Applicator A is a single unit applicator and applicator A' is a multiple unit applicator, it being understood that both forms are shown in the drawings mounted on the same feed unit for illustrative purposes only and that any desired combination of feed units and applicators can be utilized within the scope of this invention.

The applicators of my invention may be utilized with any suitable means for supplying the granular material thereto, and particularly with those mechanisms which include a mobile hopper from which granular material is controllably discharged through one or more discharge spouts as the hopper travels over the ground. However, the accompanying drawings illustrate a novel and preferred feed mechanism especially designed for continuously feeding the granular material to the applicators at a uniform, constant rate of flow to provide even distribution and concentration of material along the length of the applied band, said means in the accompanying drawings comprising a feed box or hopper 5 in which the material to be dispensed and applied is carried, said hopper having the inwardly and downwardly converging front wall 6 and back wall 7, the lower ends of which are spaced apart both vertically and horizontally. The hopper box is also provided with a removably mounted elongate bottom trough 8, disposed transversely of the direction of travel, the front wall 8a of which is detachably secured to the front wall 6 of the box by means of a suitable fastener 9, the front wall 8a providing a continuation for the front wall 6 of the hopper and inclining downwardly and rearwardly therefrom. The almost vertical back wall 8b of the trough is detachably secured to the downwardly offset and slightly rearwardly inclined portion 7a of the back wall 7 by means of a suitable fastener such as the bolt 10. The front wall 8a and back wall 8b are interconnected and the trough completed by a curved or semi-circular portion 8c. A series of longitudinally spaced apart discharge openings 11, which may be either round, oval, square or of any shape desired, are provided in the rear face of the trough adjacent the point of juncture between the back wall 8b and the curved portion 8c, with the openings 11 being located above the lowermost part of the trough and the lowermost part of the auger mechanism hereinafter to be described.

The shape of the discharge openings depend in part on what type of granule or seed is to be distributed. The trough portion is preferably removable to provide for the use of interchangeable troughs having different spacings of the discharge openings 11 according to the width of the rows to be treated with the material or to enable troughs having different shapes and sizes of discharge openings 11 to be used, according to whichever is best suited to the particular material being applied and distributed. A feed shaft 12 is rotatably mounted and disposed longitudinally within the trough 8 and journaled in suitable bearings 33 and is interconnected by any suitable means with the traction wheels W which support and carry the hopper for movement over the ground so that the shaft will be driven in response to the movements of the wheels W. The feed shaft 12 carries thereon spiral auger means such as the helically wound springs 13 which have only their ends fastened to the shaft and may be wound so as to feed in one direction only or may be wound right and left handedly on opposite sides of each of the discharge openings 11 as shown in the accompanying drawings, with the oppositely wound auger units 13a and 13b on opposite sides of each of the discharge openings 11 cooperating to feed the material from opposite sides thereof towards the discharge openings 11 for common discharge therefrom. A baffle member 14 is mounted interiorly of the applicator box by means of the bolts 10 and provides an extension of the back wall 7 of the hopper. The baffle 14 extends downwardly and forwardly over the auger unit and cooperates with the front wall 8a of the trough to provide a narrow opening or throat for feeding the material generally tangentially downwardly of the front side of the auger, which carries the material under the auger unit and across the curved portion 8c and generally axially towards the openings 11 for discharge therefrom. The baffle 14, by completely overlying the top of the auger unit, shields the top and backside of the auger from any downpouring material and the auger unit is thereby able to work more efficiently to deliver a steady uniform stream of material to the discharge openings. The back portion of the baffle is bent downwardly to provide an intermediate mounting portion 14a suitably apertured to receive the fastener 10, with the lower free end portion 14b thereof being offset forwardly to hold back excessive upward material movement past and above and beyond the discharge openings 11 and to prevent the material from overflowing or riding up on the top of the feed shaft from the back side thereof to again add to the efficiency of the auger unit and the feed mechanism.

A tube holder 15 having a generally upstanding back wall 15a and a generally horizontally disposed bottom portion 15b is detachably mounted somewhat behind and beneath the trough, the back wall 15a having secured thereto upstanding vertically slotted tube holder brackets 16 which serve to mount the holder on the hopper, the slots slidably receiving the shank of the fasteners 10, the upper end portions of the brackets being held in place on the assembly by being clamped between a spacer nut 34 and the wing nut 17 threaded into the fastener 10. The tube holder 15 is detachably mounted for the same reason as the trough, namely to adjust for variations in spacing between the crop rows to be treated. The upper free edge portion 15c of the back wall 15a is turned downwardly somewhat and inwardly and is overlapped by a rearwardly bent flange portion 7b of the offset portions 7a of the back wall 7 to prevent moisture from coursing down the outside of the back wall 7 and into the tube holder 15 and subsequently into the discharge tubes. The bottom portion 15b of the tube holder is provided with suitable longitudinally spaced openings each in substantial alignment with a discharge opening 11 in the trough, and are adapted to removably receive and seat the discharge tubes or spouts 18 through which the material to be distributed is discharged to the applicator attachment unit A hereinafter to be described, the material being steadily delivered to the discharge tubes 18 from the discharge openings 11 in the trough at a uniform rate by means of the auger unit working in the trough.

The lower free edge portion of the front wall 6 of the hopper is provided with a downwardly offset baffle or water shield 19 which prevents water from running down the outside of the front wall 6 of the hopper and the front wall 8a of the trough and past the upturned lip 15c of the tube holder which lies contiguous with the bottom of the trough and into the tube holder 15.

To drive the feed shaft 12 in response to the movements of the wheels W, any suitable means may be employed. One preferred system is that shown in the accompanying drawings, in which one end of the shaft 12 outside the hopper is provided with a variable speed drive pulley 35 in which the opposing inner faces of the opposite halves of the pulley are tapered or convergingly inclined to define a V-shaped channel for receiving a drive belt 36, the opposing halves being adapted to be moved towards or away from each other to selectively vary the cross sectional size of the V-shaped channel, and by so doing varying the effective diameter of the pulley portion engaged by the belt and thereby selectively varying the rate of rotation of the feed shaft and the rate of feed of material to be applied and dispersed through the discharge openings 11 and tubes 18 to the applicating unit A. When the wheeled hopper stops moving, the feed mechanism stops, and vice versa. The spacing between the opposing halves of the pulley is controlled, in the form shown, by a series of washers 37 which are of different gauge, and which are slidably mounted on the outer end of the shaft beyond the pulley. A stop pin 38 is mounted on the shaft outwardly of the pulley for holding the spacing washers in proper position thereon between it and the outer half of the drive pulley 35. Thus, by varying the number and/or size of the washers 37 between the outer half of the pulley and the stop pin 38, the spacing between the pulley halves and the rate of feed can be varied. The extra washers are carried outwardly of the stop pin on the shaft 12 between the pin and the outer collar. Thus, the speed of rotation of the feed shaft is changed or varied by shifting washers from one side of the stop pin to the other, each washer shifted to the pulley side of the pin closing the sheaves further and each washer shifted to the outside of the pin from the pulley side parts or separates the sheaves.

The rotatable wheel axle 39 carries a drive pulley 40 about which the belt 36 is trained for transmitting rotational drive from the wheels to the auger shaft. The auger shaft and wheel axle 39 are interconnected by a toggle type pivot bearing bracket 41 having an overcenter locking action to keep the belt tight. When speed changes are to be made, the central portion of the bracket 41 is raised, loosening the bracket and the drive belt. When the necessary adjustments have been made in the variable pulley, the center of the bracket is lowered and the two pivotally interconnected lever portions forming the bracket are locked in alignment to tighten the belt.

Thus, as the feed unit F including the hopper 5 is drawn over the ground, the rotation of the bracket wheels W effects rotation of the auger mechanism to which material is fed through the narrowly constricted throat defined by the baffle 14 and the front wall 8a of the trough. The material is continuously fed to and under the auger which draws the material around the curved portion 8c and delivers it to the discharge openings 11, it being noted that the discharge openings 11 are preferably disposed above the lowermost edge or portion of the auger element. It will be understood that the feed mechanism of this invention is not limited to the precise form shown. Thus, the auger spirals 13 may be unyieldingly fastened to the auger shaft instead of being spring wound as shown, and any suitable means, auger or otherwise, may be employed for conveying the granular material from the hopper across the trough and up the back side thereof to the discharge openings, preferably so as to accomplish a uniform rate of flow of granular material therefrom.

The applicator attachment of this invention may comprise a single unit A or a multiple unit such as the double unit A′, both of which are shown in the drawings for purpose of illustration. The single unit A is described in detail hereinafter, it being understood that the description of the single unit applies equally well to the multiple unit A′, unless otherwise indicated.

The applicator attachment or unit A of my invention which is adapted to be removably mounted or attached to and used in combination with any suitable source of material or feed unit, preferably one capable of uniform rate of delivery such as that previously herein described comprises a rigidly mounted upper housing 20 which is interconnected with the source of material by means of an elongate preferably flexible transparent material transfer tube 21, with the lower end portion of the distributor housing 20 having an enclosed hollow skirt portion 22 pivotally and swingably suspended therefrom, the housing 20 and skirt 22 combining to provide an enclosed chute or passageway for the granular material.

The distributor housing is wide and narrow in shape and generally of inverted U-shaped cross section which includes the back wall portion 20a and the front wall portion 20b which are interconnected by the top portion 20c having a centrally disposed opening 20d therein and which has an upwardly extending tubular neck 23 communicating with the opening 20d and the interior of the housing 20 for directing granular material thereinto.

The tubular neck portion 23 is provided with a series of alternately crisscrossed deflector pins or bolts 24 which extend diametrically of the tube 23 and are alternately arranged at right angles to one another so that adjacent pins break up and subdivide the stream of material as it passes through the tube 23 and distributes the stream of material in the tube uniformly over the entire cross sectional area of the tube 23 as the material enters the housing 20. The upper end of the tubular neck 23 may be connected with the lower end portion of the flexible tube 21 by any suitable means. In the form shown in the drawings, the bolts 24 serve double duty by also being used to secure the lower end of the tube 21 to the neck 23, the upper end portion of the tube 21 being secured to the discharge tubes 18 in any suitable manner as by the bolts 42. The ends of the housing 20 are enclosed by means of bracket members 25, the lower ends of which are provided with laterally extending pivot pins 26 upon which the skirt 22 is pivotally mounted.

The skirt 22 provides a passageway which is enclosed and defined by the front wall 22a, the back wall 22b, and the sides 22c, which also provide a narrow elongate discharge mouth 27 at the lower end of the skirt for applying the granular material in a wide narrow stream and uniform row on the ground being traversed thereby. The lower edge of the front wall 22a is provided with a depending lip 28.

A perforated distributing and spreading member or screen 29 is mounted within the housing 20 so as to extend between the walls 20a and 20b thereof and is of generally inverted V-shaped design, with the apex of the distributor being disposed in alignment with the center of the tube 23 and immediately adjacent the lower edge thereof so as to equally sub-divide the material issuing from the inlet opening to insure that equal amounts of material are directed to the opposite sides thereof. The distributor member is provided with holes or openings 29a in each of the legs thereof through which the granular material passes. The legs of the distributor are preferably bowed concavely downwardly in such fashion as to provide uniform even distribution or discharge of the material therefrom across the entire width or span of the screen. The distributor may be resilient or springy in nature and the outer ends thereof are retained in proper position within the housing by means of the bolts or members 30 which are mounted adjacent the lower edge of the housing 20 and transversely thereof and against which the lower ends of the deflector screen tensionedly rest. Another transverse bolt 30′ holds the apex of the distributor in fixed position beneath the tube 23. The bowed design of the legs of the distributing member permit the material collected thereatop to be evenly and uniformly discharged therethrough and distributed thereby in a wide uniform band across the entire width or span of the distributing member, the material ultimately being applied to the ground in the same even pattern or band into which it is formed by the distributing member.

The tube 21 may be provided with a valve member 31 carried on an elongate pivotally mounted rod 32 disposed transversely of the tube and having a handle portion 32a disposed outwardly of the tube for opening and closing the valve. The purpose of the valve is to trap a measured or known amount of granular material in the tube prior to a test to determine how much is applied per acre or area. The test is accomplished by opening the valve and driving a measured distance and determining from a previously prepared chart how much material is applied for every inch in the tube. If the attachment has more than one discharge tube only one test tube is necessary to complete this test.

The applicators are suspended from the mobile feed unit by means of elongate mounting brackets 44 which are detachably fastened at their upper ends to the horizontal supporting arm 50, which is suspended from the hopper by means of strap members 51 and are fastened at their lower ends to the upstanding ear portions 25a of the members 25 whereby the upper housing 20 is rigidly vertically suspended from the feed unit.

Each side of the skirt is provided with a step-shaped bracket 45, the rearwardly extending leg thereof being fastened to the side 22c of the skirt and provided with an aperture for pivotally receiving the pivot pin 26 whereby the skirt is swingably suspended from the upper housing 20. An elongate spring member 46 has its upper end fastened to a bracket 45 and the lower end thereof fastened to the forwardly extending leg of the bracket 45 to yieldingly resist backward swinging movement of the skirt and pull it back to the vertical when the skirt is swung rearwardly upon encountering any obstacles during its travel over the ground. To prevent the skirt 22 from swinging forwardly past its normal vertical position, a stop member 47 is mounted on the intermediate leg of the bracket 45 and extends rearwardly therefrom so as to abut with the front face 20b of the upper housing when the upper housing 20 and skirt 22 are substantially vertically aligned. Thus, if an obstacle is encountered by the skirt, it is free to yield and swing rearwardly as shown by the dotted position of FIG. 1, but it will be immediately swung forwardly to normal position by the spring 46 when the obstacle has been passed, and will immediately assume a vertical position due to the stop member 47. To prevent air currents from easily penetrating into the interior of the applicators, and to prevent spillage of material between the upper housing and the skirt, particularly during relative movement therebetween, the upper marginal edges of the front and back faces of the skirt are provided with upwardly and outwardly extending lips 48 and 49 respectively.

As the material is fed to and through the tube 21 by means of the feed mechanism, the material within the tube 23 is broken up, repeatedly subdivided and evenly distributed across the cross-sectional width thereof by means of the baffle pins 24. As the material is evenly discharged from the neck 23, it is divided by the apex of the member 29 into substantially equal portions which are directed onto the opposite sides or legs of the distributing and spreading member 29. The material is evenly spread out on the legs of the member 29 and evenly distributed or discharged through the openings therein and pass downwardly through the housing and the skirt and are evenly distributed in a wide narrow uniform band upon the crop row being treated. The skirt portion 22 shields the material from the wind and drafts until the last possible moment with the discharge mouth thereof being disposed immediately above the ground so that the material is distributed directly onto the ground without being disturbed and without upsetting the uniform even band or pattern effected by the distributing member.

The multiple unit A' is similar in all respects to the single unit A having a single upper housing and a single skirt pivotally suspended therefrom, the only difference being that the upper housing is provided with two or more inlet openings 20d and a corresponding number of distributing screens 29, which screens may be in end to end relationship to provide a continuous band of material, made up of individual parallel bands or may be spaced apart to provide a series of spaced apart parallel bands comparable to what would be achieved by using a series of individual units A, so as to treat a plurality of crop rows simultaneously.

Thus, a single applicating unit such as A, or a series of individual units may be utilized, to distribute a series of laterally spaced apart parallel bands or one or more multiple units such as A' may be used to spread either a single continuous wide band of material or a laterally spaced apart series of individual bands capable of treating a series of adjacent rows simultaneously.

In operation, the hopper 5 of the feed unit shown is filled with the granular herbicide or other material to be distributed. One or more applicating units are attached thereto, and properly positioned over the crop rows to be treated. As the assembly is drawn over the ground, the auger is rotated simultaneously with the wheels and continuously and steadily draws the material from the hopper and feeds the material to and through the discharge openings 11 in the trough with the rate being controlled by the spacing between the cooperating halves of the pulley 35, the feed unit shown performing exceptionally well in providing a uniform flow of material to each of the applicators. The material falls from the openings 11 into the discharge tubes 18, and then downwardly through the transfer tube 21 and tubular neck 23, where the flow of material is broken up by the deflector pins 24 and distributed evenly over the entire cross sectional area thereof; the material then being substantially evenly divided as it enters the housing 20 and spread out over the legs of the distributing member. The material passes through the legs of the distributing member and is discharged downwardly therefrom in a wide uniform even band effected by the distributing member, and is ultimately discharged from the mouth 27 of the enclosed skirt in the same wide uniform band or pattern unto the crop row, with the skirt protecting and shielding the material and maintaining the even distribution pattern until the material is deposited upon the ground, with the skirt yielding and then springing back to the vertical if an obstruction is encountered thereby.

From the foregoing, the advantages of my invention are readily apparent. The feed mechanism including the hopper, trough and the auger are designed to feed the material at a constant uniform rate to the applicating unit as the assembly is drawn over the ground, with distribution automatically ceasing upon cessation of forward movement of said assembly. Not only does the feed mechanism illustrated provide for uniform steady flow of material to each of the applicator units, but the deflector pins located in the tubular neck of the applicator housing cooperate to divide, redivide and evenly disperse the steady flow of material in the tube so that the material is evenly distributed across the cross sectional area of the tube and is discharged to the opposite sides of the perforate distributing and spreading member in substantially equal amounts. The perforate distributing member in turn is so designed that the granular material fed thereto from the tubular neck 23 and equally divided on opposite sides thereof is evenly discharged therefrom across the entire width of the perforate member due to the bowed or concave construction or design. Thus, the granular material is discharged from the mouth of the skirt onto the ground in the same uniform band across the entire width of the applicator so that there is a uniform concentration of granular material across the entire width of the band applied and the row being treated. The feed unit and applicating unit combine to insure that the granular material is not only spread uniformly on the crop row widthwise, but is also applied at an even rate to provide substantially uniform concentration throughout the entire length of the band or row applied.

Thus, the uniformity of concentration desired throughout the length and breadth of the row of granular material applied is achieved by the cooperation of the various elements making up the entire assembly. The perforated distributing member provides the wide uniform pattern of distribution, the deflector pins and central positioning of the apex of the distributing screen insure that the legs of the screen receive equal amounts of material, and the feed mechanism provides the constant rate of feed.

It will, of course, be understood that various changes may be made in the form, detail, arrangement and proportion of the parts without departing from the scope of my invention which consists of the matter described herein and set forth in the appended claims.

What is claimed is:

1. In apparatus for distributing granular material upon the ground, a mobile hopper, said hopper including a lower trough portion, a discharge opening in one side of said trough portion, and disposed above the bottom thereof, auger means mounted in said trough for conveying material in said trough to said discharge opening, first baffle means overlying said auger means and shielding the top portion thereof from material in said hopper, said first baffle means cooperating with a wall of said hopper to define a throat adjacent the other side of said trough for feeding material from said hopper generally downwardly along one side of said auger into said trough, and second baffle means extending inwardly from said one side of said trough and disposed between said one side of said trough and said first baffle means and above said discharge opening for intercepting material carried upwardly past said discharge opening and confining it to the area adjacent said opening and preventing material reaching the top portion of said auger from the discharge side thereof.

2. An applicator for granular material comprising a wide narrow normally generally vertically disposed housing comprising upper and lower portions which define a continuously downwardly directed passage through which material can fall by gravity from the top to the bottom of said housing, said upper portion having a material inlet opening therein, the lower end of said lower portion terminating in a wide discharge mouth normally disposed transversely of the direction of travel, a perforate inverted generally V-shaped distributing member mounted in said upper portion with the apex thereof located adjacent to and centrally of said inlet opening whereby the material entering the housing through said opening is divided into two substantially equal parts, one part to be distributed by one leg of said member, the other part to be distributed by the other leg of said member, said member having a large number of small openings substantially uniformly arranged therethroughout permitting passage of said granular material therethrough, the legs of said members being downwardly concaved to achieve uniform distribution of said material thereby, said lower housing being hingedly mounted for swinging movement about a horizontal axis transverse to the direction of travel, spring means adapted to yieldingly resist rearward swinging movement of the lower housing from its normal operative position and further adapted to return said lower housing to said normal position after rearward swinging movement, stop means adapted to prevent forward swinging movement of said lower housing from its normal operative position, and means for mounting said applicator on a mobile implement in such fashion that said upper portion of said housing is held rigid during use.

3. An applicator for granular material comprising upper and lower housing structure defining an enclosed chute providing a continuously downwardly directed passage through which material can fall by gravity from the top to the bottom of said chute, said chute having a discharge mouth in the bottom of said lower housing structure and a material inlet opening in the top of the upper housing structure, an inverted generally V-shaped perforated distributing member mounted in the upper housing having its apex located adjacent to and centrally of said inlet opening whereby the material entering through said opening is substantially equally divided and the divided parts directed to each of the legs of said member, said lower housing being hingedly mounted for swinging movement about a horizontal axis transverse to the direction of travel, spring means adapted to yieldingly resist backward swinging movement of the lower housing from its normal operative position and further adapted to return said lower housing to said normal position after backward swinging movement, stop means adapted to prevent forward swinging movement of said lower housing from said normal operative position, and means for holding said upper housing rigid.

4. The applicator of claim 3, wherein the front wall of the lower housing extends below the back wall of the lower housing and the lower marginal edge portion of said front wall is bent outwardly and downwardly.

5. A granular material applicator comprising a wide narrow normally vertically disposed housing having upper and lower portions hingedly connected together for swinging movement of the lower portion about a horizontal axis transverse to the direction of travel, said portions defining a continuously downwardly directed passage through which material can fall by gravity from the top to the bottom of said housing, said upper portion having a plurality of material inlet openings therein and a material distributing member mounted therewithin for each of said openings, each of said members being inverted generally V-shaped perforated members whose apexes are located adjacent to and centrally of their respective openings for dividing the material entering said openings into substantially equal parts which are delivered to each of the legs of said members, spring means adapted to yieldingly resist backward swinging movement of the lower housing from its normal operative position and further adapted to return said lower housing to said normal position after rearward swinging movement, and stop means adapted to prevent forward swinging movement of said lower housing from said normal operative position, 6. An applicator for granular material comprising upper and lower housing structure which together define an enclosed continuously downwardly directed chute through which material can fall from the top to the bottom thereof by force of gravity, which chute terminates at its lower end in a downwardly opening discharge mouth, said upper housing structure having an inlet opening formed in the top thereof, said discharge mouth being wider than said inlet opening, an inverted perforated V-shaped material distributing member mounted in said upper housing with its apex in substantial alignment with said inlet opening, said member being adapted to distribute the material delivered thereto from said inlet opening in a uniform band of greater width than said inlet opening, said lower housing being hingedly mounted for swinging movement thereof relative to said upper housing.

7. The applicator of claim 6, wherein the legs of said V-shaped distributing member are downwardly concavely curved.

8. The applicator of claim 6, wherein said lower housing is swingable in one direction from normal operating position to a second position, and spring means biasing said lower housing towards normal position.

9. The applicator of claim 6, wherein the legs of said V-shaped distributing member are downwardly concavely curved, and wherein said lower housing is swingable in one direction from normal operating position to a second position, and spring means biasing said lower housing towards normal position.

10. In combination, hopper means mounted for travel over the ground and applicator means mounted for movement with said hopper means and adapted to receive material from said hopper and distribute it evenly upon the ground being traversed, and including transparent tubular means interposed between said hopper means and said applicator means for conveying the material therebetween, valve means interposed in said tubular means for trapping a predetermined amount of material in said tube prior to distribution thereof on the ground, to permit testing of said applicator means to determine how much material is distributed on the ground per unit of area covered.

References Cited by the Examiner

UNITED STATES PATENTS

| | | | |
|---|---|---|---|
| 301,898 | 7/1884 | Hopper | 222—459 X |
| 1,385,254 | 7/1921 | Loft | 222—459 |
| 1,695,692 | 12/1928 | Kreisinger | 222—459 X |
| 2,546,702 | 3/1951 | Ready | 222—533 X |
| 2,630,247 | 3/1953 | Rafferty | 222—159 |
| 2,684,788 | 7/1954 | Bland | 222—177 |
| 2,755,002 | 7/1956 | Gustafson | 222—412 X |
| 2,804,998 | 9/1957 | Kirschmann | 222—177 |
| 2,852,166 | 9/1958 | Gandrud. | |
| 2,990,186 | 6/1961 | Gandrud | 275—14 |
| 3,074,727 | 1/1963 | Sosalla et al. | 275—14 |

LOUIS J. DEMBO, *Primary Examiner.*

RALPH M. LUPO, *Examiner.*